(12) United States Patent  
Kuwabara et al.

(10) Patent No.: US 8,225,898 B2  
(45) Date of Patent: Jul. 24, 2012

(54) ARRANGEMENT OF COMPONENTS IN A VEHICLE, AND VEHICLE INCORPORATING SAME

(75) Inventors: Naoki Kuwabara, Saitama (JP); Hiroaki Tomita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 12/584,936

(22) Filed: Sep. 15, 2009

(65) Prior Publication Data

US 2010/0078256 A1 Apr. 1, 2010

(30) Foreign Application Priority Data

Sep. 30, 2008 (JP) ................................. 2008-253177

(51) Int. Cl.  
*B60K 17/354* (2006.01)
(52) U.S. Cl. .......................... 180/233; 180/376; 280/834
(58) Field of Classification Search .................. 180/233, 180/246, 247, 248, 291, 374, 375, 376, 908; 280/834

See application file for complete search history.

(56) References Cited

U.S. PATENT DOCUMENTS

| | | | | |
|---|---|---|---|---|
| 2,071,537 A * | 2/1937 | Keese | ........................... | 180/292 |
| 5,099,943 A * | 3/1992 | Resca et al. | ................... | 180/233 |
| 5,383,531 A * | 1/1995 | Yoshioka et al. | ............. | 180/233 |
| 5,564,518 A * | 10/1996 | Ishii et al. | ...................... | 180/242 |
| 7,637,343 B2 * | 12/2009 | Nakagaki et al. | ............. | 180/233 |
| 2002/0005310 A1 * | 1/2002 | Kaneyuki et al. | ............. | 180/246 |
| 2003/0141127 A1 * | 7/2003 | Kobayashi | ..................... | 180/233 |
| 2005/0087380 A1 * | 4/2005 | Brown | ........................... | 180/233 |
| 2007/0029126 A1 * | 2/2007 | Shigeta et al. | ................ | 180/247 |

FOREIGN PATENT DOCUMENTS

JP 2006-103368 4/2006

\* cited by examiner

*Primary Examiner* — Anne Marie M Boehler  
(74) *Attorney, Agent, or Firm* — Carrier Blackman & Associates, P.C.; William D. Blackman; Joseph P. Carrier

(57) ABSTRACT

A vehicle includes a vehicle body frame, an internal combustion engine supported on the vehicle body frame, a propeller shaft assembly operatively connected to a crankshaft of the engine, a driveshaft, a final drive unit disposed between the front propeller shaft assembly and the driveshaft, a pair of occupant seats arranged side by side in a vehicle width direction, a pedal cluster, and a reduction gear located rearward of the pedal cluster and frontward of the occupant seats. The propeller shaft assembly includes a first propeller shaft disposed at a rear of the reduction gear, and a second propeller shaft disposed at a front of the reduction gear. The second propeller shaft is offset toward a second seat side in a vehicle width direction with respect to the first propeller shaft.

17 Claims, 11 Drawing Sheets

ARRANGEMENT OF COMPONENTS IN A VEHICLE, AND VEHICLE INCORPORATING SAME

CROSS-REFERENCE TO RELATED APPLICATIONS

The present invention claims priority under 35 USC 119 based on Japanese patent application No. 2008-253177, filed on Sep. 30, 2008. The entire subject matter of this priority document, including specification claims and drawings thereof, is incorporated by reference herein.

BACKGROUND OF THE INVENTION

1. Field of the Invention

The present invention relates to an arrangement of selected drive train parts as well as other components in a vehicle, and to a vehicle incorporating the same. More particularly, the present invention relates to a vehicle drive train having a propeller shaft assembly, including a first propeller shaft disposed behind a reduction gear and a second propeller shaft disposed forward of the reduction gear, where the drive train components are arranged in relation to a vehicle frame as well as other vehicle components, and to a vehicle incorporating the described drive train and other components.

2. Description of the Background Art

There is a known vehicle structure including a reduction gear disposed in a front portion of the vehicle. An example of such vehicle structure is disclosed in Japanese Patent Application Publication No. 2006-103368.

According to the vehicle structure disclosed in Japanese Patent Application Publication No. 2006-103368, an internal combustion engine and a fuel tank are disposed below a pair of occupant seats arranged side by side in a vehicle width direction, and a propeller shaft extends forwardly from the internal combustion engine is connected to a reduction gear, disposed in the front portion of the vehicle.

In the vehicle structure body described in the Japanese Patent Application Publication No. 2006-103368, since the internal combustion engine and the fuel tank are disposed in a space located below the occupant seats, the seats and the floor are arranged at relatively higher positions. Accordingly, a large space can be easily secured under the floor, so that the arrangement of a pedal cluster, such as a brake pedal and an accelerator pedal, which are configured to be operated by the driver, is not so much limited. The vehicle structure thus has an advantage since the arrangement of the brake pedal and accelerator pedal is relatively flexible.

However, in a vehicle having a lowered floor and a lowered center of gravity in pursuit of a sportier driving experience, such as a multi-use vehicle (MUV), the presence of a propeller shaft may limit the positions where the pedal cluster, e.g., a brake pedal and an accelerator pedal, may be placed.

The present invention has been made in view of the above-mentioned circumstances. Accordingly, it is one of the objects of the present invention to provide a vehicle body and drive train structure in which a floor and a center of gravity are lowered by lowering the positions of the floor and occupant seats, and with which the flexibility in layout of a pedal cluster is improved with reduced limitation on positions where the pedal cluster may be placed.

SUMMARY OF THE INVENTION

In order to achieve the above objects, the present invention according to a first aspect thereof provides a vehicle body and drive train structure including a vehicle body frame; an internal combustion engine supported on the vehicle body frame; a propeller shaft assembly connected to a crankshaft of the internal combustion engine and configured to transmit a driving force of the internal combustion engine; a driveshaft having wheels rotatably attached respectively to both end portions thereof; a final drive unit disposed between the propeller shaft assembly and the driveshaft, and configured to transmit the driving force form the propeller shaft assembly to the driveshaft; a pair of occupant seats arranged side by side in a vehicle width direction, and including a driver' seat (a first seat) and a passenger seat (a second seat); a pedal cluster operable by an occupant's foot; and a reduction gear located rearward of the pedal cluster and frontward of the occupant seats, and configured to convert a rotational direction of the propeller shaft to a reverse direction. The reduction gear is operable to rotate the second propeller shaft in a direction reverse to a rotational direction of the first propeller shaft.

The present invention according to the first aspect thereof is characterized in that the propeller shaft assembly includes a first propeller shaft disposed at the rear of the reduction gear, and a second propeller shaft disposed at the front of the reduction gear. The second propeller shaft is offset toward a second seat side in the vehicle width direction with respect to the first propeller shaft.

The present invention according to a second aspect thereof, in addition to the first aspect, is characterized in that the vehicle body and drive train structure further includes a fuel tank for storing fuel. The fuel tank is disposed on the passenger seat side in the vehicle width direction in such a manner as to overlap the first propeller shaft, when viewed in a side view.

The present invention according to a third aspect thereof, in addition to one of the first and second aspects, is characterized in that the first propeller shaft is located substantially on a center line of a vehicle body, and the second propeller shaft is offset toward the passenger seat side substantially with respect to the center line of the vehicle body.

Further, the second propeller shaft is connected to the final drive unit on the passenger seat side in the vehicle width direction. The final drive unit is disposed substantially on the center line of the vehicle body.

EFFECTS OF THE INVENTION

According to the first aspect of the present invention, the propeller shaft assembly for transmitting the driving force of the internal combustion engine includes the first propeller shaft disposed at the rear of the reduction gear and the second propeller shaft disposed at the front of the reduction gear. The reduction gear is located rearward of the pedal cluster and frontward of the occupant seats, and converts a rotational direction of the propeller shaft into a reverse direction. The second propeller shaft is offset toward the passenger seat in the vehicle width direction with respect to the first propeller shaft. This arrangement makes it possible to secure a large space for arrangement of pedal cluster, such as a brake pedal and an accelerator pedal, and thereby improve the flexibility in design.

According to the second aspect of the present invention, the fuel tank is disposed on the passenger seat side in such a manner as to overlap the first propeller shaft, when viewed in the side view. In other word, the fuel tank and the first propeller shaft are arranged side by side in the vehicle width direction. Accordingly, it possible to secure a large space for arrangement of the fuel tank with no limitation due to the propeller shaft, and to thus increase the tank capacity.

In addition, such arrangement of the fuel tank also makes it possible to reduce the thickness of a portion of the vehicle body below the occupant seats, thereby allowing the vehicle to have a low floor and a low center of gravity. Furthermore, since the fuel tank is located on the passenger seat (second seat) side, that is, a side opposite to the driver's seat (first seat) where a driver is always seated during operation of the vehicle, it is possible to improve the weight balance between the left and right sides of the vehicle body.

According to the third aspect of the present invention, the first propeller shaft is located substantially on the center line of the vehicle body. In addition, the second propeller shaft is offset toward the passenger seat (second seat) side substantially with respect to the center line of the vehicle body, and is connected to the final reducer on the passenger seat side in the vehicle width direction, and the final drive unit is disposed substantially on the center line of the vehicle body.

Accordingly, the first propeller shaft, the reduction gear, and the final drive unit can be substantially aligned with the center line of the vehicle body. Such arrangement of the first propeller shaft, the reduction gear, and the final drive unit makes it possible to achieve a favorable weight balance between the left and right sides of the vehicle, and also to secure a sufficient space for arrangement of the first seat and the second seat. Moreover, since the frame width can be suppressed to the minimum, the upper or lower frame can be elongated. In addition, since the swing angle can be made uniform between the left and right driveshafts, the wheel stroke can be further increased.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
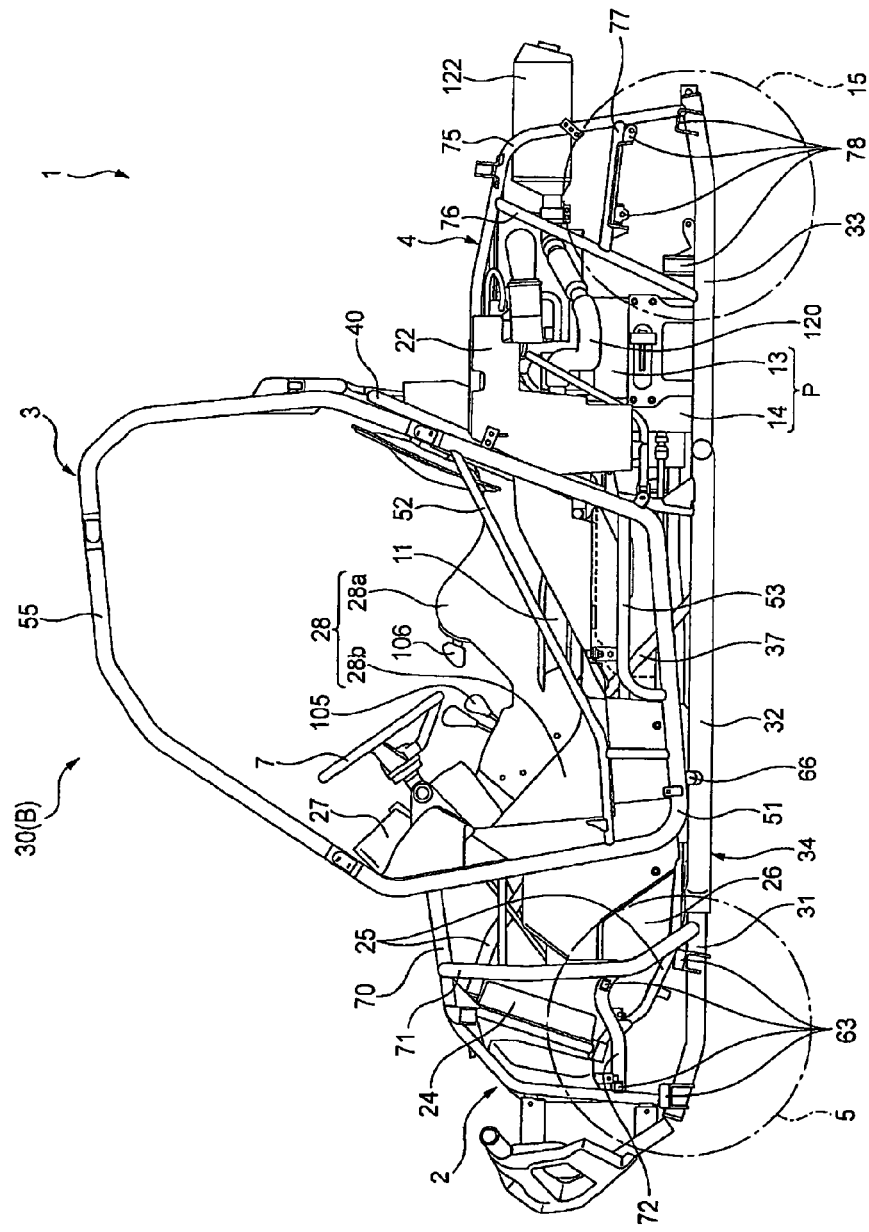
FIG. 1 is a left-side view of a vehicle incorporating arrangement of components forming a vehicle body and drive train structure according to the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, an illustrative embodiment according to a vehicle body and drive train structure of the present invention is described with reference a vehicle, particularly with reference to a multi-use vehicle (MUV). It may be noted that the drawings should be viewed in the direction of orientation of reference numerals.

Figure 2:
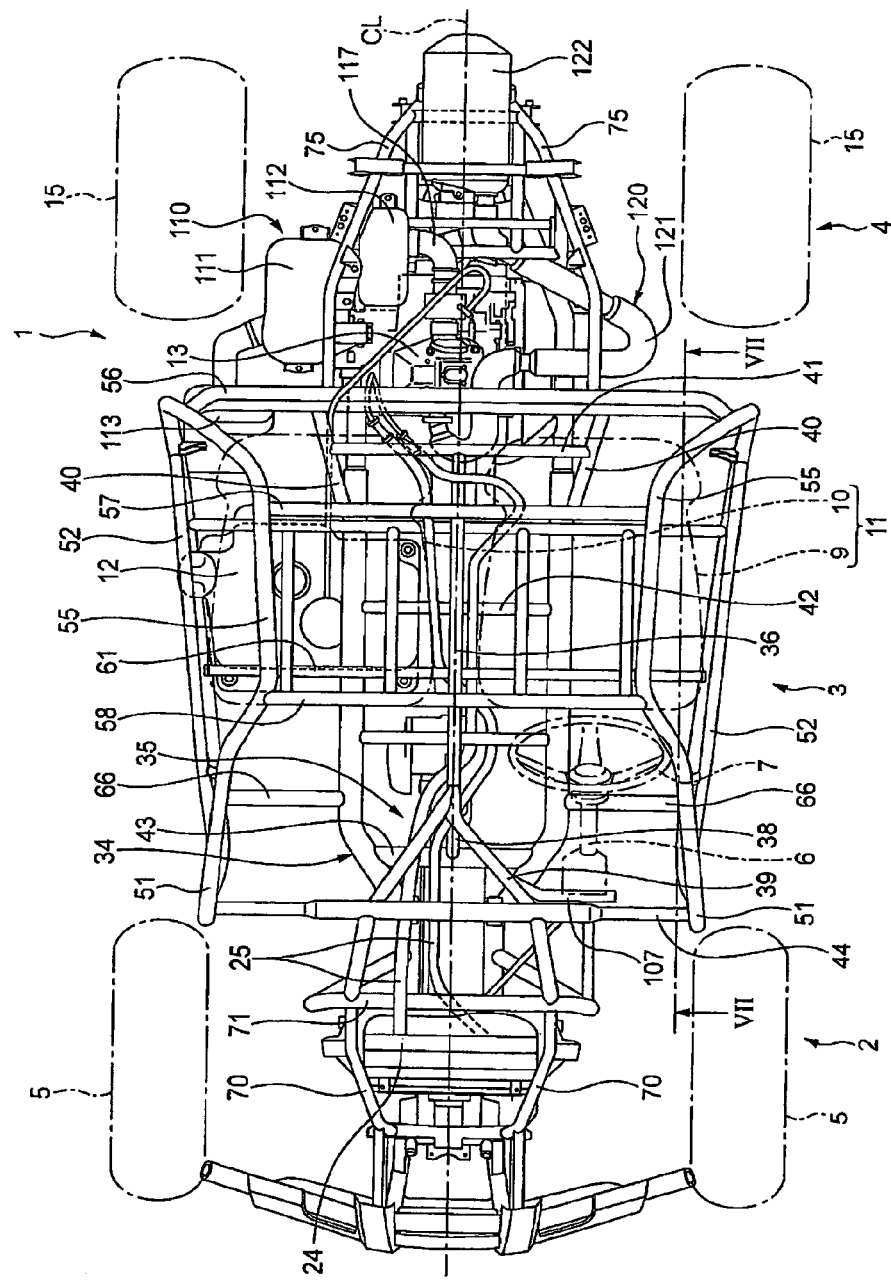
FIG. 2 is a plan view of the vehicle illustrated in FIG. 1.
Figure 3:
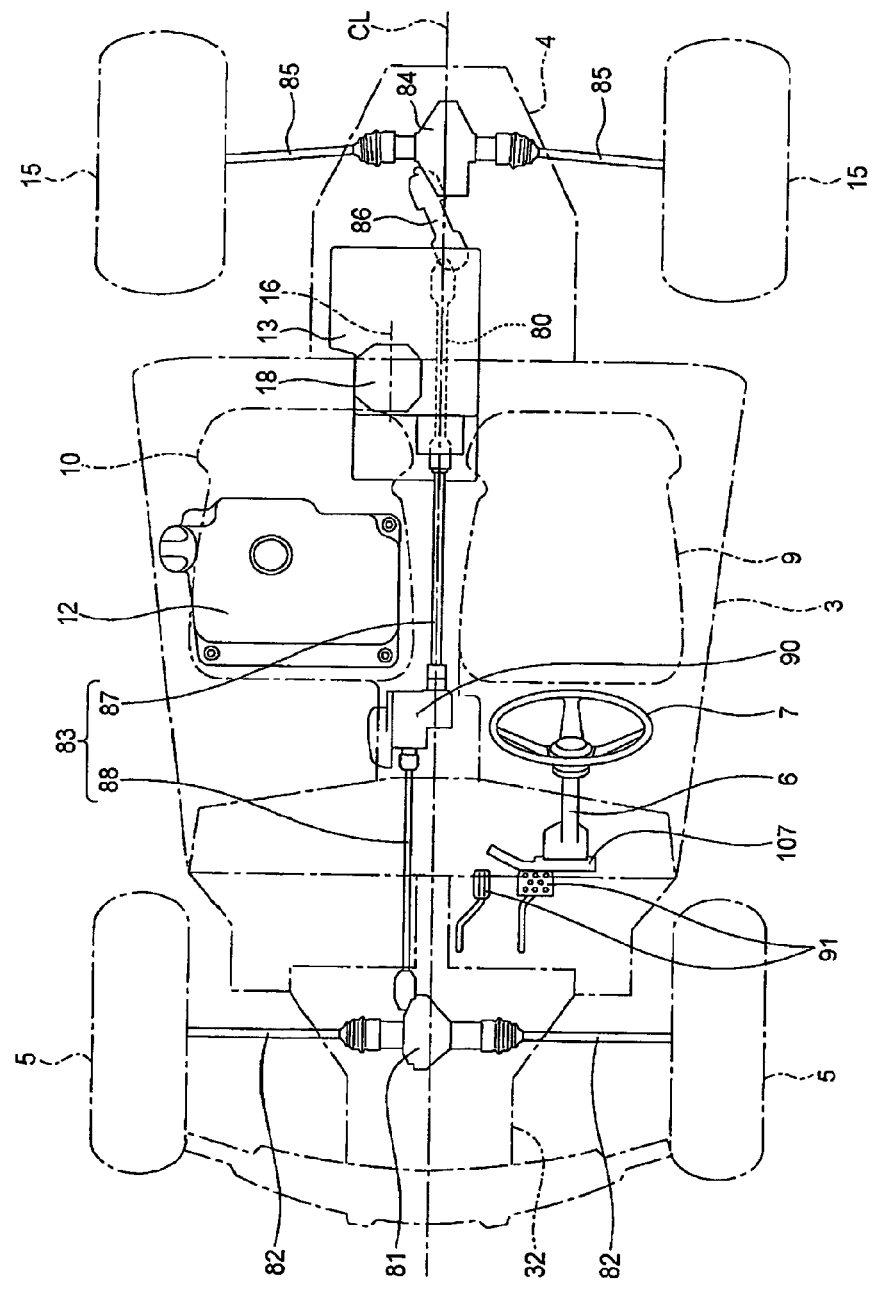
FIG. 3 is a plan view of main components of a power transmission mechanism of the vehicle illustrated in FIG. 1.

As shown in FIGS. 1 through 3, a vehicle 1 (for example, an MUV) according to the illustrative embodiment includes a vehicle body frame 30. The vehicle body frame 30 includes a front frame portion 2, a center frame portion 3, and a rear frame portion 4 for forming a vehicle body B.

A front-wheel suspension system (not shown) which suspends left and right front wheels 5 is attached to the front frame portion 2. In addition, a front-wheel drive system including a front final drive unit 81, front driveshafts 82, and the like; steering members (including a steering shaft 6 and a steering wheel 7 attached to an upper end portion of the steering shaft 6) for steering the front wheels 5; and the like are supported on the front frame portion 2.

A plurality of occupant seats 11, e.g., a pair of occupant seats 11 arranged side by side in a vehicle width direction is attached to the center frame portion 3. The pair of occupant seats 11 includes a first seat (a driver's seat) 9 and a second seat (a passenger seat) 10. A fuel tank 12 is disposed in a space below the second seat 10. A portion of a front propeller shaft (also referred as a front propeller shaft assembly) 83 coupling a power unit P and a front final drive unit 81 is disposed between the driver's seat 9 and the passenger seat 10.

A rear-wheel suspension system (not shown) which suspends left and right rear wheels 15 is attached to the rear frame portion 4. In addition, a rear-wheel drive system including, for example, a rear propeller shaft (a rear propeller shaft assembly) 86, a rear final drive unit 84, rear driveshafts 85; and the like are supported on the rear frame portion 4 in addition to the power unit P including an internal combustion engine 13 and a transmission 14.

As shown in FIG. 3, the power unit P supported on the rear frame portion 4 is arranged vertically such that a crankshaft 16 of the internal combustion engine 13 is oriented in a front-rear (a longitudinal) direction of the vehicle body. An output shaft 80 to which a driving force is transmitted from the crankshaft 16 is disposed substantially on a center line CL of the vehicle body. The output shaft 80 is coupled at a front end thereof with the front propeller shaft assembly 83, and is coupled at a rear end thereof with the rear propeller shaft 86.

The rear propeller shaft 86 is connected to the rear final drive unit 84 disposed substantially on the center line CL of the vehicle body. The driving force of the internal combustion engine 13 is transmitted to the left and right rear wheels 15 via the rear propeller shaft 86, the rear final drive unit 84, and the rear driveshafts 85 connected to the rear final drive unit 84.

The front propeller shaft assembly 83 is provided with a reduction gear 90 at an intermediate portion thereof. The front propeller shaft assembly 83 includes a first propeller shaft 87 and a second propeller shaft 88. The first propeller shaft 87 is disposed at the rear of the reduction gear 90, while the second propeller shaft 88 is disposed at the front of the reduction gear 90.

The reduction gear 90 transmits the rotational force of the first propeller shaft 87 to the second propeller shaft 88 while converting the rotational direction of the first propeller shaft 87 to a reverse direction in order to rotate the front wheels 5 and the rear wheels 15 in the same direction. In other words, the reduction gear is operable to rotate the second propeller shaft 88 in a direction reverse to a rotational direction of the first propeller shaft 87.

Accordingly, the driving force of the internal combustion engine 13 is transmitted to the left and right front wheels 5 via the first propeller shaft 87, the reduction gear 90, the second propeller shaft 88, the front final drive unit 81, and the front driveshafts 82 connected to the front final drive unit 81.

Figure 8:
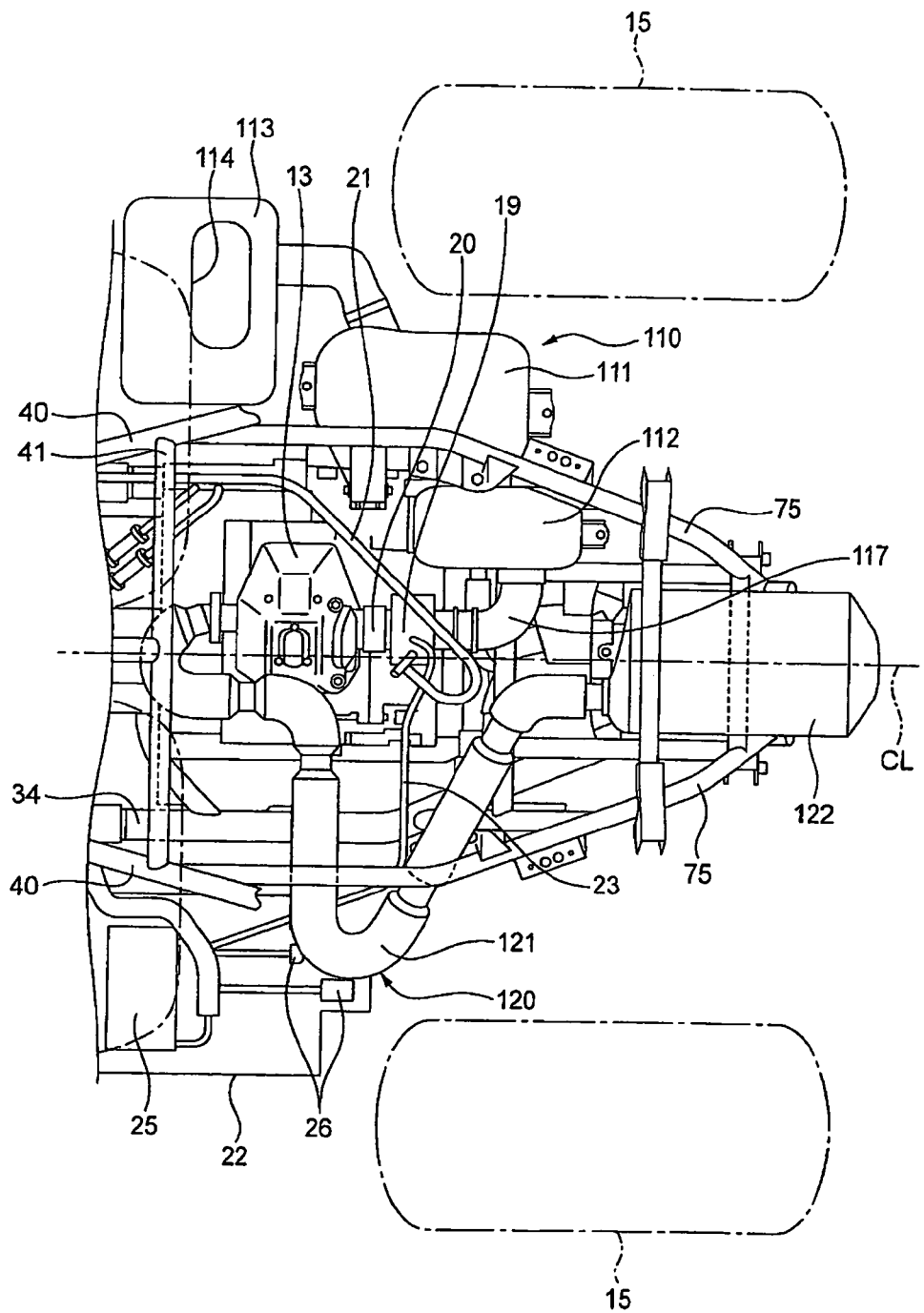
FIG. 8 is a plan view illustrating, in an enlarged manner, rear main components illustrated in FIG. 2.

As shown in FIG. 8, a throttle valve unit 19 is connected to a rear portion of a cylinder head 18 of the internal combustion engine 13 via an intake manifold 20. An exhaust pipe 120 (described later) is connected to a front portion of the cylinder head 18. An air cleaner 110 including first and second air cleaner chambers 111 and 112 (described later) is connected to a rear portion of the throttle valve unit 19 via a connecting tube 117.

A fuel supply pipe 21 and a wire harness (cable harness) 23 are connected to the throttle valve unit 19. The fuel supply pipe 21 extends from the fuel tank 12. The wire harness 23 is arranged to extend from a battery case 22, an ECU 26, and the like.

Figure 4:
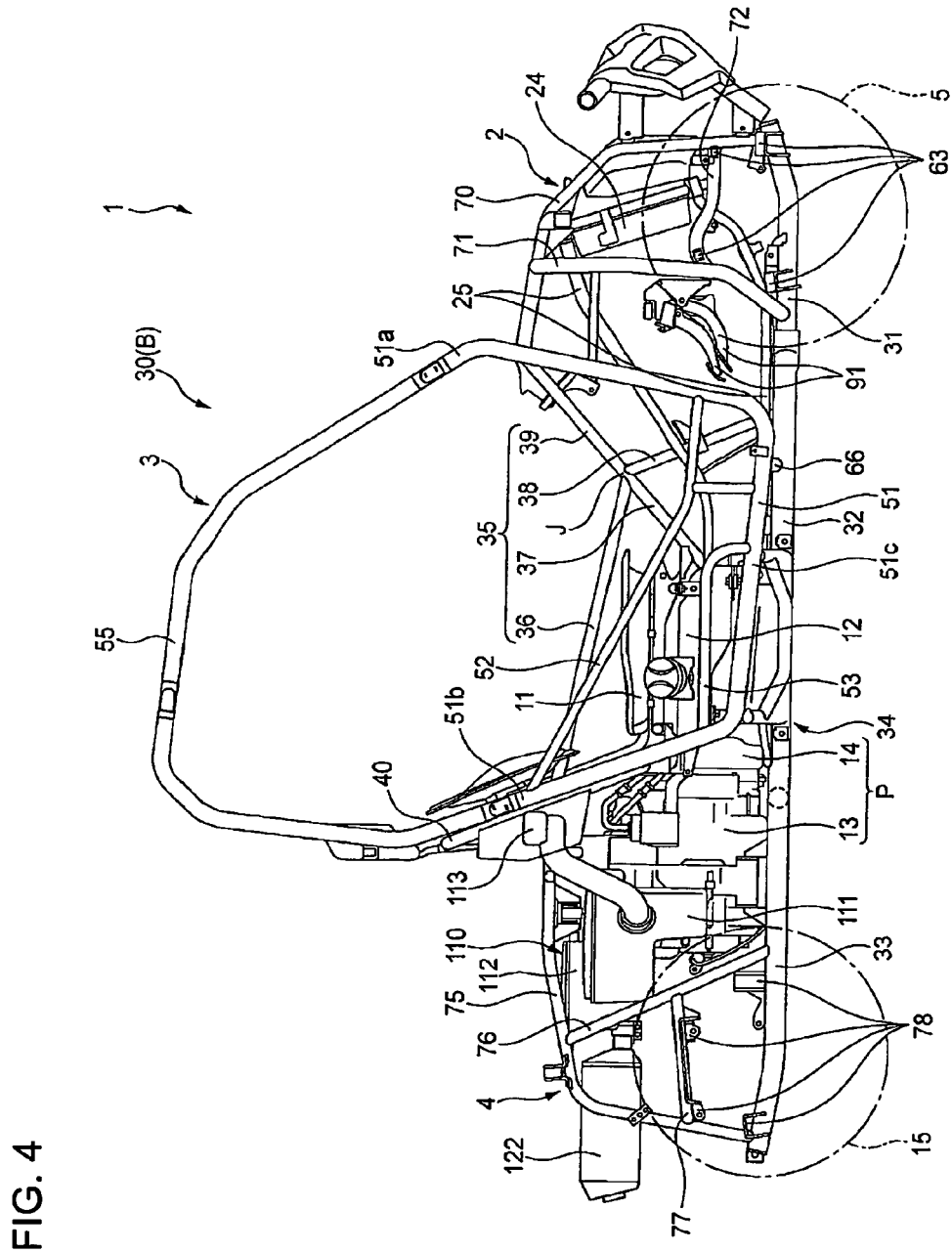
FIG. 4 is a right-side view of the vehicle illustrated in FIG. 1.

Moreover, as shown in FIGS. 2 and 4, a radiator 24 disposed in the front frame portion 2 is connected to the internal combustion engine 13 via two water supply pipes 25. Thus, cooling water for cooling the internal combustion engine 13 circulates between the radiator 24 and the internal combustion engine 13 through the water supply pipes 25.

As shown in FIG. 1, the vehicle 1 includes a front cover 26, an instrument panel 27, a center console cover 28 including a center cover member 28a and a pair of left and right cover members 28b.

Figure 5:
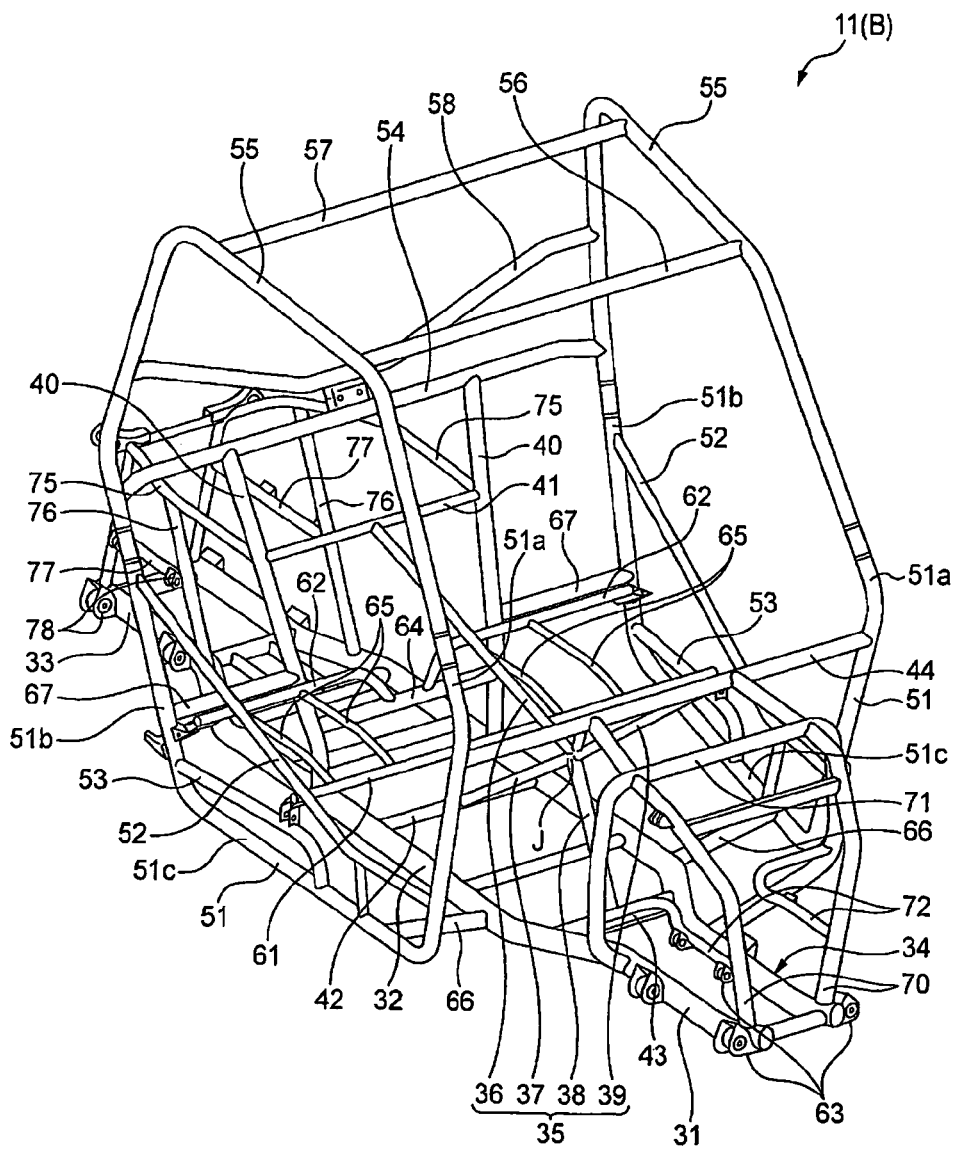
FIG. 5 is a perspective view of a frame structure of the vehicle illustrated in FIG. 1.
Figure 6:
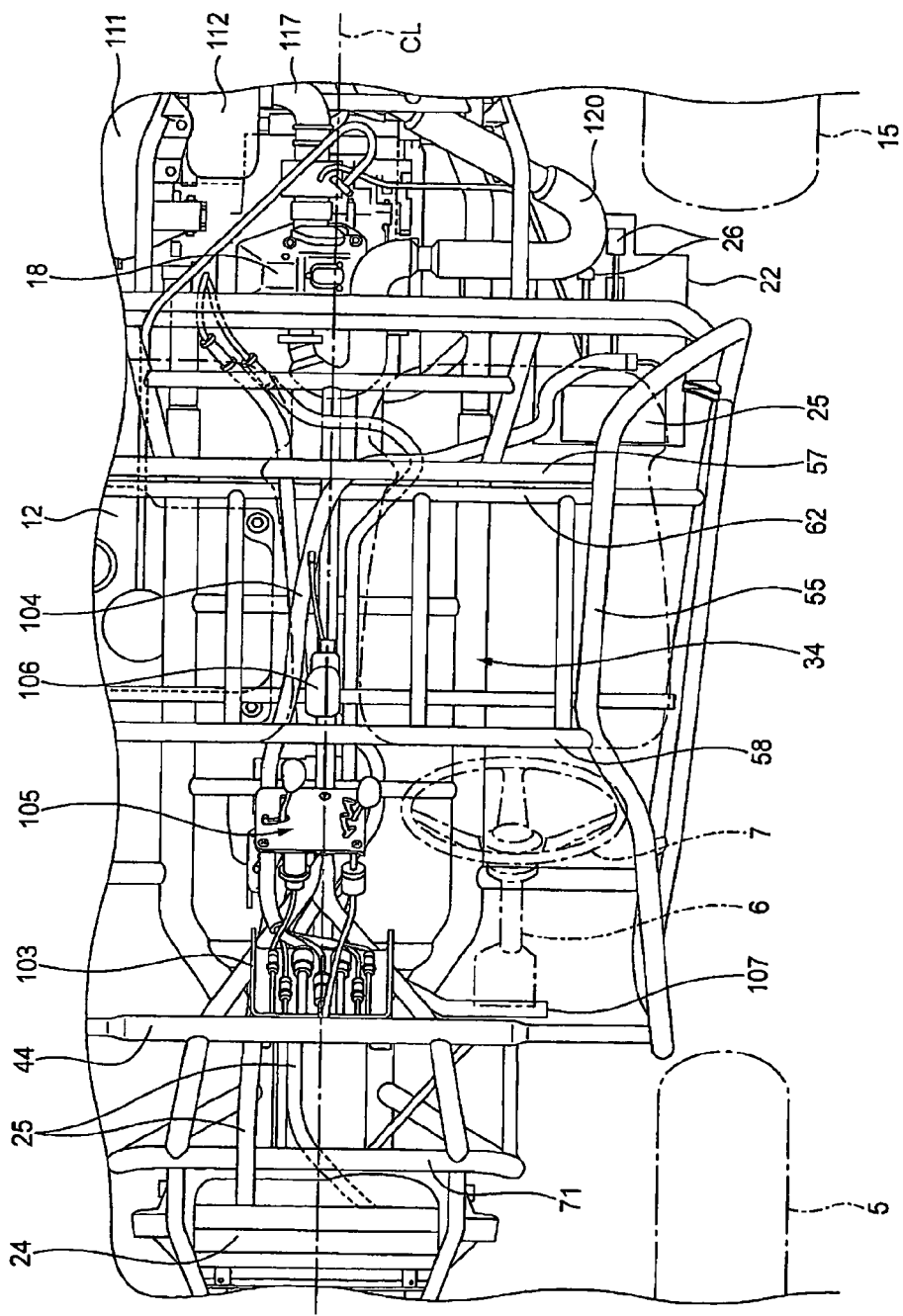
FIG. 6 is a plan view of, in an enlarged manner, main components including arrangement of communications cables.

As shown in FIGS. 4 and 5, the vehicle body frame 30 includes a pair of lower frames 34 disposed respectively in left and right lower portions of the vehicle body B and extending in the front-rear direction. Each of the lower frames 34 forms a front lower frame 31, a center lower frame 32, and a rear lower frame 33.

In the front frame portion 2, pair of left and right front upper frames 70 extend upward from front ends of the respective front lower frames 31, and further extend rearward, and are joined to a front upper cross-member 44. In this manner, the left and right front upper frames 70 cover a front portion of the vehicle body B from above. The front lower frames 31 and the front upper frames 70 are coupled with each other by a square U-shaped frame 71.

In addition, rising portions of the square U-shaped frame 71 are coupled respectively to rising portions of the front upper frames 70 by front-suspension support pipes 72 each having a substantially L-shape. Two brackets 63 are fixed onto each of the front lower frames 31 and the front-suspension support pipes 72, and the front-wheel suspension system is swingably disposed on the brackets 63. The front-wheel suspension system rotatably suspends the left and right front wheels 5.

On the other hand, in the rear frame portion 4, a pair of left and right rear upper frames 75 extend upward from rear ends of the rear lower frames 33, thereafter are bent to extend frontward in such a manner as to cover the power unit P including the internal combustion engine 13, and are joined respectively to a pair of center upright frames 40.

The center upright frames 40 extend upward from portions of the respective center lower frames 32 behind the occupant seats 11. Horizontal portions of the rear upper frames 75 are vertically connected to the rear lower frames 33 respectively by rear upright frames 76, each of which is inclined frontward while extending downward. Moreover, the rear upright frames 76 are connected respectively to perpendicular portions of the corresponding rear upper frames 75 respectively by rear-suspension support pipes 77.

Two brackets 78 are fixed respectively onto front and rear portions of each of the rear lower frames 33 and the rear-suspension support pipes 77. The rear-wheel suspension system, in its entirety, is swingably disposed on the four brackets 78. The rear-wheel suspension system suspends the left and right rear wheels 15 in a manner that the rear wheels 15 are rotatable.

In the center frame portion 3, a pair of left and right side frames 51 extending in the front-rear direction are disposed respectively outside the center lower frames 32 in the vehicle width direction. The side frames 51 are joined to the respective lower frames 34 by connecting pipes 66 and connecting pipes 67. The connecting pipes 66 are connected to front portions of the respective center lower frames 32, while the connecting pipes 67 are connected to intermediate portions of the respective center upright frames 40.

Each of the side frames 51 includes a front rising portion 51a, a rear rising portion 51b, and a horizontal portion 51c joining the front and rear rising portions 51a and 51b. Thus, each of the side frames 51 is formed in a substantially square U-shape, which is convex downward.

In each of the substantially square U-shaped side frames 51, the front rising portion 51a and the rear rising portion 51b are coupled to each other by a side pipe 52 in the front-rear direction. End portions of the respective front rising portions 51a of the pair of side frames 51 are coupled to each other by the front upper cross-member 44 in the vehicle width direction. Middle portions of each rear rising portion 51b and the corresponding horizontal portion 51c are coupled to each other by a seat supporting pipe 53 having a substantially L shape.

A pair of side upper frames 55, each formed into a substantially square U shape, are each connected to the front rising portion 51a and the rear rising portion 51b of a corresponding one of the pair of side frames 51 in such a manner that the side upper frame 55 is convex upward. The pair of side upper frames 55 are coupled to each other in the vehicle width direction by a first upper cross-member 54, to which the pair of center upright frames 40 are joined at upper end portions thereof; two roof cross-members 56 and 57, and a cross-member 58 for headrest, which is joined at a middle portion thereof to the first upper cross-member 54.

A first seat cross-member 61 is arranged between the pair of seat supporting pipes 53 with brackets therebetween. In addition, a pair of second seat cross-members 62 is joined to the rear rising portions 51b of the respective side frames 51 with brackets therebetween. The second seat cross-members 62 are joined to a rear cross-member 64 which connects the pair of center upright frames 40 to each other at portions lower than the middle portions thereof. The seat frames includes the first and second seat cross-members 61 and 62, coupling frames 65, which couple the respective second seat cross-members 62 to the first seat cross-member 61 in the front-rear direction. Seat pipes 60 (see FIG. 9) for the first seat 9 and the second seat 10 are attached to the seat frames.

In addition, a center pipe assembly 35 is arranged in the center frame portion 3. The center pipe assembly 35 passes between the driver's seat 9 and the passenger seat 10 and is arranged above the lower frames 34 to extend in the front-rear direction substantially on the center line CL of the vehicle body. Accordingly, the center frame portion 3 has a structure in which the center pipe assembly 35 and the pair of lower frames 34 are disposed respectively on the upper and lower sides in the center portion in the vehicle width direction, and the side pipe 52 and the side frame 51 are disposed on the upper and lower sides in each of the side portions. Such structure makes it possible to improve the rigidity of the center frame portion 3 as well as to achieve a low floor and a low center of gravity.

Figure 7:
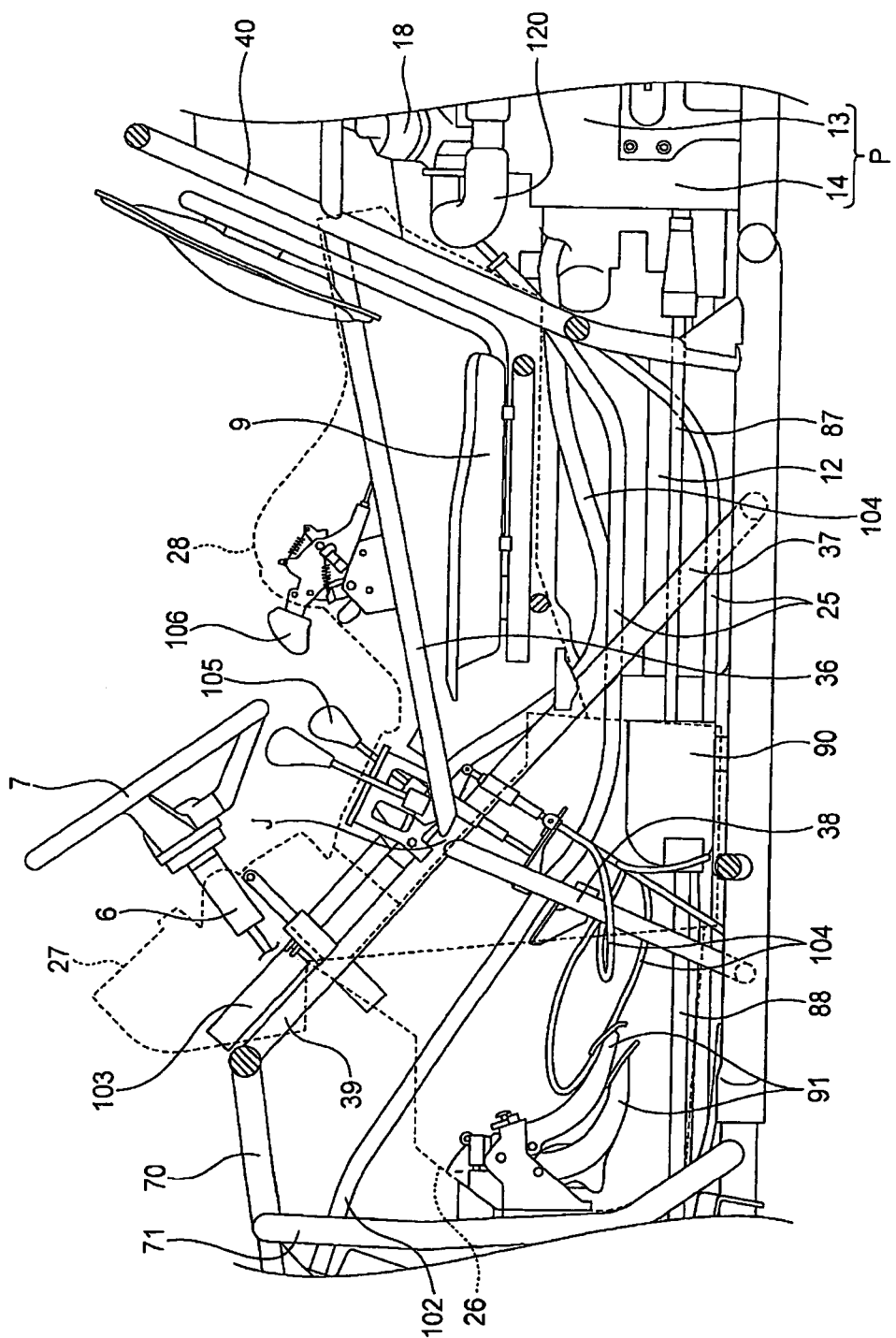
FIG. 7 is a side view taken along the line VII-VII in FIG. 2, illustrating an inside of a center console cover in an enlarged manner.

As shown in FIG. 7, the center pipe assembly 35 includes an upper center pipe 36, a down center pipe 37, an upright center pipe 38, and a front center pipe 39. These members 36, 37, 38, and 39 are joined together at a joint point J located forward of the occupant seats 11.

The upper center pipe 36 extends frontward while being joined at one end thereof to a center portion of a rear upper cross-member 41 which couples the pair of center upright frames 40 to each other. The down center pipe 37 extends upward and frontward while being joined at one end thereof to a center portion of a rear lower cross-member 42 which is arranged between the center lower frames 32 at a position below the occupant seats 11.

The upright center pipe 38 extends rearward and upward while being joined at one end thereof to a center portion of a front lower cross-member 43 which is laid between the center lower frames 32 at a position forward of the occupant seats 11. The front center pipe 39 is a pipe member that is formed into a substantially V shape with two branches extending frontward respectively to the left and right from the joint point J as the base point. An end portion of each of the left and right branches is joined to the front upper cross-member 44 in a vicinity of the joint portion of a corresponding one of the front upper frames 70 to the front upper cross-member 44.

On the center pipe assembly 35, a shift lever 105 is attached to a portion above a vicinity of the joint point J having increased rigidity, and a side-brake lever 106 is attached to a portion above an intermediate portion of the upper center pipe 36. It may be noted that, the steering shaft 6, which is a steering member, is attached to the front upper cross-member 44 with a sub-frame 107 interposed therebetween. Communicating wires (cables) extending from the shift lever 105, the side-brake lever 106, and the steering shaft 6; and from pedal cluster 91, such as a brake pedal and an accelerator pedal, are disposed on the first seat 9 side, and the like. These extending wires are gathered in an electric connection box 103, and then bundled into a single wire harness 104, which is eventually connected to the battery case 22 provided behind the driver's seat 9.

In addition, as shown in FIGS. 2, 3 and 7, the first propeller shaft 87 is located below and along the center pipe assembly 35 substantially on the center line CL of the vehicle body. The first propeller shaft 87 is disposed in such a manner as to overlap the fuel tank 12, when viewed in a side view, i.e., in such a manner that the first propeller shaft 87 and the fuel tank 12 are arranged side by side in the vehicle width direction. The second propeller shaft 88 connected to the reduction gear 90 is disposed offset toward the passenger seat 10 with respect to the first propeller shaft 87 in the vehicle width direction. Moreover, the second propeller shaft 88 is coupled with, on the passenger seat 10 side, the front final drive unit 81 disposed substantially on the center line CL of the vehicle body above the front lower frames 31.

As described above, since the front propeller shaft 83 is arranged substantially along the center pipe assembly 35, the torsion in the vehicle 1 is unlikely to act on the front propeller shaft 83. In addition, since the second propeller shaft 88 is disposed offset toward the passenger seat 10 in the vehicle width direction, a large space for occupants can be secured even with the lowered floor, and also, the flexibility in layout of the pedal cluster 91 is improved, so that the pedal cluster 91 can be disposed at positions where the pedal cluster 91 are easily operated.

Moreover, the reduction gear 90 is located forward of the pair of occupant seats 11, and also behind the pedal cluster 91, such as the brake pedal and accelerator pedal, disposed on the first seat 9 side, and is disposed between the down center pipe 37 and the upright center pipe 38.

The two water supply pipes 25, which connect the radiator 24 and the internal combustion engine 13, as well as the wire harness 104, which electrically connects the electric connection box 103 and the battery case 22, are also disposed offset toward the passenger seat 10 side in the vehicle width direction, partially in a region forward of the upright center pipe 38, as in the case of the front propeller shaft 83.

Accordingly, the center console cover 28 provided between the first seat 9 and the second seat 10 houses the center pipe assembly 35, the front propeller shaft 83, the reduction gear 90, the water supply pipes 25, the wire harness 104, the shift lever 105, and the side brake lever 106, while a front portion of the center console cover 28 is offset toward the second seat 10 side.

With this arrangement, the water supply pipes 25 and the wire harness 104 are compactly arranged by utilizing the dead space. As a result, a large space for occupants can be secured, and also, the flexibility in layout of the pedal cluster 91 is improved, so that the pedal cluster 91 can be disposed at positions where the pedal cluster 91, i.e., the brake pedal and the accelerator pedal are easily operated.

Further, while the vehicle body frame 30 is formed in a bilaterally symmetrical arrangement, the front final drive unit 81, the reduction gear 90, the internal combustion engine 13, the rear final drive unit 84, and the like, which are major heavy components, are disposed substantially on the center line CL of the vehicle body. As a result, a favorable weight balance between the left and right sides is achieved to increase the stability of the vehicle 1. Moreover, since the frame width can be suppressed to the minimum, the upper or lower frame can be elongated. In addition, since the swing angle can be made uniform between the left and right driveshafts, the wheel stroke can be further increased.

Figure 9:
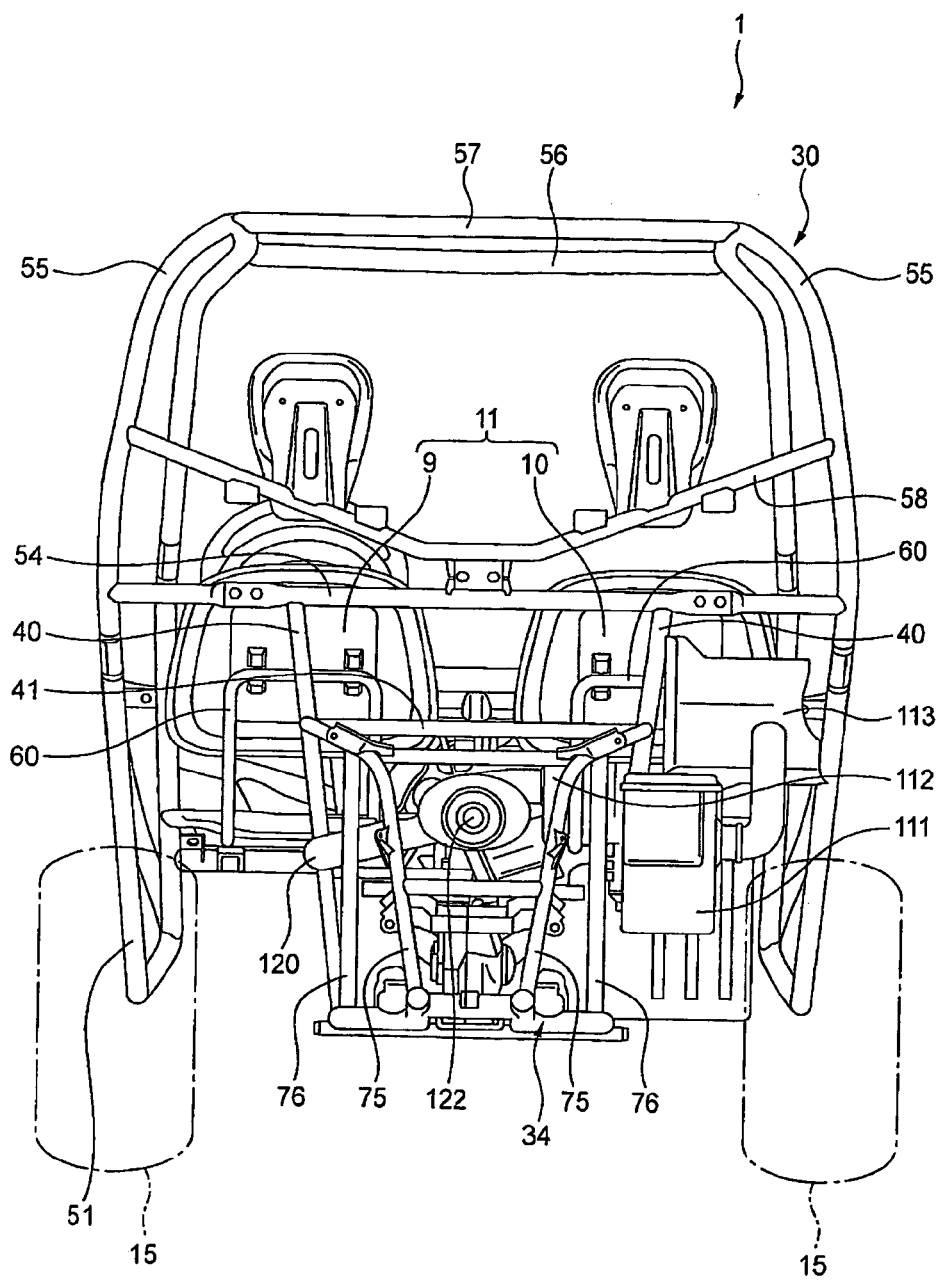
FIG. 9 is a rear view of the vehicle illustrated in FIG. 1.
Figure 10:
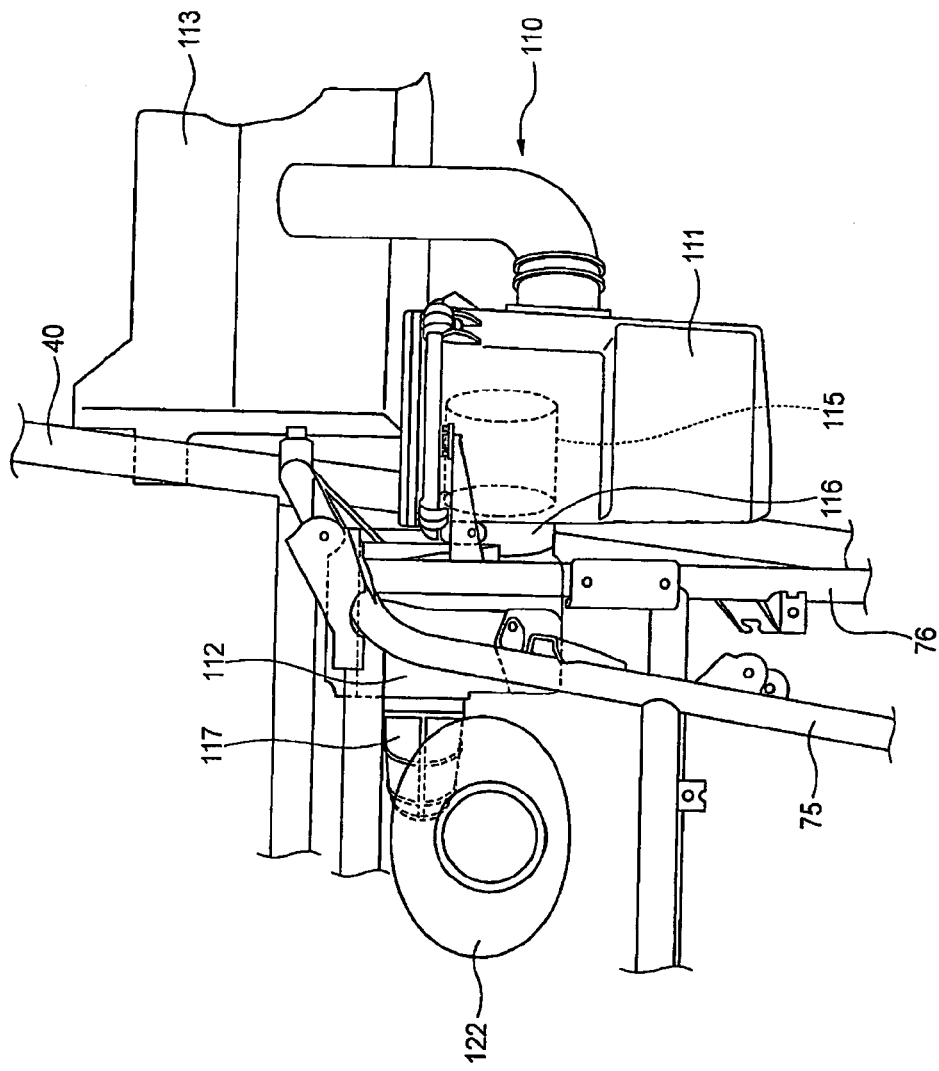
FIG. 10 is a rear view illustrating, in an enlarged manner, main components of an intake structure shown in FIG. 9.

As shown in FIGS. 8 through 10, the air cleaner 110, which is an air-intake device, is disposed behind the passenger seat 10 on the right side of the internal combustion engine 13. The air cleaner 110 includes the first air cleaner chamber 111 and the second air cleaner chamber 112.

A snorkel 113 is connected to the first air cleaner chamber 111 via a duct attached to an outer side surface of the first air cleaner chamber 111 in the vehicle width direction. The snorkel 113 is disposed behind the passenger seat 10 and has a cover 114 for covering its opening. The first air cleaner chamber 111 and the second air cleaner chamber 112 face each other in the vehicle width direction with the rear upright frame 76 on the corresponding side being partially sandwiched therebetween, and communicate with each other via a coupling tube 116. In addition, the second air cleaner chamber 112 is connected to the internal combustion engine 13 via the connecting tube 117.

Accordingly, the first air cleaner chamber 111 is disposed outside the corresponding rear upright frame 76 in the vehicle width direction, and the second air cleaner chamber 112 is disposed inside the rear upright frame 76 in the vehicle width direction. In addition, an air cleaner element 115 for removing dust in the air is housed in the first air cleaner chamber 111.

In the air cleaner 110, as described above, external air is introduced from the snorkel 113; then dust in the air thus introduced is removed by the air cleaner element 115 in the first air cleaner chamber 111; the purified air is guided to the second air cleaner chamber 112 through the coupling tube 116, and thereafter, is supplied to the internal combustion engine 13 from the connecting tube 117.

The air cleaner 110 includes the first air cleaner chamber 111 disposed outwardly of the corresponding lower frame 34 in the vehicle width direction, and the second air cleaner chamber 112 disposed inwardly thereof in the vehicle width direction. Accordingly, the air cleaner 110 having a large capacity can be compactly disposed in a narrow space surrounded by the frames.

In addition, since the first air cleaner chamber 111 is disposed outward of the corresponding rear upright frame 76 in the vehicle width direction, a large space for maintenance of the air cleaner 110 can be secured. Therefore, a maintenance operation can be easily performed on the air cleaner 110, that is, the air cleaner 110 has an excellent maintainability.

It should be noted that the above-described effect can be obtained even when the first and second cleaner chambers 111 and 112 are disposed to sandwich a part of the corresponding lower frame 34 or of the corresponding rear upper frame 75 instead of the rear upright frame 76, in accordance with the position where these chambers 111 and 112 are attached.

Figure 11:
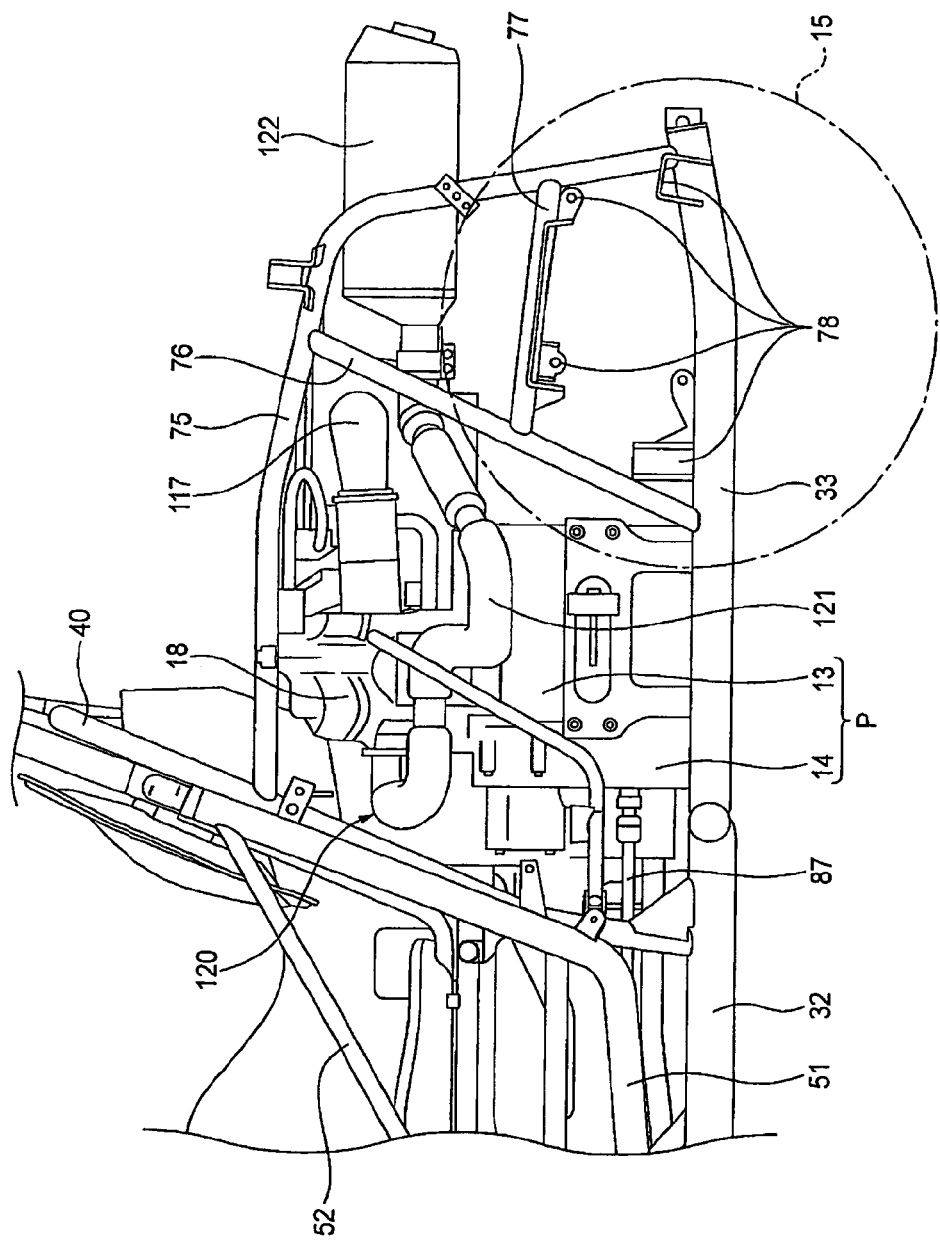
FIG. 11 is a side view illustrating, in an enlarged manner, a rear frame portion shown in FIG. 1.

Moreover, as shown in FIGS. 8 and 11, the exhaust pipe 120 connected to the front portion of the cylinder head 18 first extends frontward, thereafter turns around and extends rearward, is further bent at substantially 90°, and linearly extends to the outside of the vehicle body while being inclined downward with respect to the horizontal plane.

Further, after reaching a region behind the driver's seat 9 in the vehicle width direction, the exhaust pipe 120 is bent to the inside of the vehicle body and linearly extends back substantially onto the center line CL of the vehicle body while being inclined upward, and is then connected to a muffler 122 disposed to extend in the front-rear direction substantially on the center line CL of the vehicle body in the rear frame portion 4. With such arrangement, an outermost extending portion 121 of the exhaust pipe 120 extends to a region inside a rearward extension line of the corresponding side frame 51 in the vehicle width direction and outside the corresponding rear upper frame 75 in the vehicle width direction.

Accordingly, a required length can be secured for the exhaust pipe 120 even in, for example, the vehicle 1 having the lowered floor, in which the space in the rear frame portion 4 is limited with the internal combustion engine 13 disposed behind the occupant seats 11. Moreover, having many straight portions, the exhaust pipe 120 can be easily processed, so that the number of assembly processes can be reduced and that the manufacturing costs thus can be suppressed.

The outermost extending portion 121 of the exhaust pipe 120 extends to the region inside the rearward extension line of the corresponding side frame 51 in the vehicle width direction and outside the corresponding rear upper frame 75 in the vehicle width direction. With this arrangement, the exhaust pipe 120 is protected while the length of the exhaust pipe 120 is sufficiently secured.

In addition, the exhaust pipe 120 extends back substantially onto the center line CL of the vehicle body within a region forward of the rear upright frames 76. Such arrangement makes it possible to securely prevent an interference of the exhaust pipe 120 with the rear-wheel suspension system disposed rearward of the rear upright frames 76.

As described above, in the vehicle body and drive train structure according to the embodiment, the front propeller shaft 83 for transmitting the driving force of the internal combustion engine 13 includes the first propeller shaft 87 disposed at the rear of the reduction gear 90, and the second propeller shaft 88 disposed at the front of the reduction gear 90.

The reduction gear 90 is located rearward of the pedal cluster 91 and frontward of the occupant seats 11. The reduction gear converts the rotational direction of the front propeller shaft 83 into the reverse direction. The second propeller shaft 88 is offset toward the passenger seat 10 in the vehicle width direction with respect to the first propeller shaft 87. This arrangement makes it possible to secure a large space for arrangement of the pedal cluster 91 such as the brake pedal and the accelerator pedal, and to thus improve the flexibility in design.

In addition, the fuel tank 12 is disposed on the passenger seat 10 side in such a manner as to overlap the first propeller shaft 87, when viewed in the side view, i.e., in such a manner that the fuel tank 12 and the first propeller shaft are arranged side by side in the vehicle width direction. Such arrangement makes it possible to secure a large space for arrangement of the fuel tank 12 with no limitation due to the front propeller shaft 83, and to thus increase the tank capacity.

In addition, this arrangement also makes it possible to reduce the thickness of a part, below the occupant seats 11, of the vehicle body, and to thus cause the vehicle 1 to have a low floor and a low center of gravity. Furthermore, since the fuel tank 12 is located on the passenger seat 10 side, that is, the side opposite to the driver's seat 9 where a person is always seated, it is also possible to improve the weight balance between the left and right sides of the vehicle body.

Moreover, the first propeller shaft 87 is located substantially on the center line CL of the vehicle body. In addition, the second propeller shaft 88 is offset toward the passenger seat 10 side substantially with respect to the center line CL of the vehicle body, and is connected to the front final drive unit 81 on the passenger seat 10 side in the vehicle width direction, while the front final drive unit 81 is disposed substantially on the center line CL of the vehicle body.

Accordingly, the front propeller shaft 83, the reduction gear 90, and the front final drive unit 81 can be substantially aligned with the center line CL of the vehicle body. This arrangement makes it possible to achieve a favorable weight balance between the left and right sides of the vehicle 1, and also to secure a sufficient space for arrangement of the driver's seat 9 and the passenger seat 10.

In addition, since the front propeller shaft 83 which transmits the driving force of the internal combustion engine 13 to the front-wheel drive system is arranged substantially along the center pipe assembly 35, the torsion in the vehicle body B is unlikely to act on the front propeller shaft 83. Moreover, the front propeller shaft 83 can be disposed by utilizing the dead space below the center pipe assembly 35, which enables a compact layout, so that a large space for occupants can be secured.

Furthermore, the reduction gear 90, which converts the rotational direction of the front propeller shaft 83 into the reverse direction, is located forward of the occupant seats 11, and also behind the pedal cluster 91, and is disposed between the down center pipe 37 and the upright center pipe 38. Accordingly, the reduction gear 90 can be disposed in the dead space where the rigidity of the vehicle body is high. As a result, it is possible to protect the reduction gear 90, and to enable a compact layout, which secures a large space for occupants.

In addition, the radiator 24 is arranged in the front frame portion 2, and the internal combustion engine 13 is arranged in the rear frame portion 4. In this arrangement, the water supply pipes 25 connecting the radiator 24 and the internal combustion engine 13 are arranged substantially along the center pipe assembly 35 in such a manner as to extend in a region on the passenger seat 10 side of the upright center pipe 38 forward of the upright center pipe 38. This arrangement allows the water supply pipes 25 to be arranged in the dead space with a high rigidity of the vehicle body. As a result, it is possible to protect the water supply pipes 25, and to enable a compact layout, which secures a large space for occupants.

Moreover, the center console cover 28 provided between the driver's seat 9 and the passenger seat 10 houses the center pipe assembly 35, the front propeller shaft 83, the reduction gear 90, the water supply pipes 25, the wire harness 104, the shift lever 105, and the side brake lever 106. Accordingly, the above members can be gathered in the center of the vehicle body, and also covered with the center console cover 28. As a result, the external appearance is improved and also a large space for occupants is secured.

It should be noted that the present invention is not limited to the above-described embodiment, and modification, improvement, and the like may be made thereon as appropriate. For example, although the present invention has been described so far as being applied to an MUV (multi-use vehicle), the present invention is not limited to the MUV but may be applied to any type of vehicle having four or more wheels in the same manner.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle body and drive train structure, comprising:
    a vehicle body frame;
    a pair of occupant seats disposed in the vehicle body frame and arranged side by side in a vehicle width direction, said pair of occupant seats comprising a first seat and a second seat;
    a pedal cluster operatively attached to the vehicle body frame; and
    a drive train operatively associated with said vehicle body frame and comprising:
    an internal combustion engine supported on the vehicle body frame and comprising a crankshaft;
    a propeller shaft assembly operatively connected to the crankshaft of the internal combustion engine and configured to transmit a driving force from the internal combustion engine therethrough;
    a driveshaft having first and second wheels rotatably attached to first and second end portions thereof, respectively;
    a final drive unit disposed between the propeller shaft assembly and the driveshaft, and configured to transmit the driving force from the propeller shaft assembly to the driveshaft;
    a fuel tank disposed on the second seat side of the vehicle body frame, and arranged so as to overlap the first propeller shaft when viewed in a side view; and
    a reduction gear located rearward of the pedal cluster and forward of the occupant seats;
    wherein the propeller shaft assembly comprises a first propeller shaft disposed rearward of the reduction gear, and a second propeller shaft disposed forward of the reduction gear;
    wherein said reduction gear is operable to rotate said second propeller shaft in a direction reverse to a rotational direction of the first propeller shaft; and
    wherein the second propeller shaft is offset in a vehicle width direction, with respect to the first propeller shaft, toward a second seat side of the vehicle body frame.

2. The vehicle body and drive train structure according to claim 1, wherein:
    the first propeller shaft is substantially aligned with a center line of said vehicle body frame, and the second propeller shaft is offset toward the second seat side with respect to the center line of the vehicle body frame;
    the second propeller shaft is connected to the final drive unit on the second seat side in the vehicle width direction; and
    the final drive unit is substantially aligned with the center line of the vehicle body.

3. The vehicle body and drive train structure according to claim 1, wherein:
    the first propeller shaft is substantially aligned with a center line of said vehicle body frame, and the second propeller shaft is offset toward the second seat side with respect to the center line of the vehicle body frame;
    the second propeller shaft is connected to the final drive unit on the second seat side in the vehicle width direction; and
    the final drive unit is substantially aligned with the center line of the vehicle body.

4. The vehicle body and drive train structure according to claim 1, wherein said first seat is located on one of a left side and a right side of the vehicle body frame, and said second seat is located on the other of said left side and said right side of the vehicle body frame; and wherein said pedal cluster is arranged forward of said first seat.

5. The vehicle body and drive train structure according to claim 1, wherein said first seat is located on one of a left side and a right side of the center line of the vehicle body, said second seat is located on the other of said left side and said right side of the center line of the vehicle body; and wherein said pedal cluster is located forward of said first seat.

6. The vehicle body and drive train structure according to claim 1, wherein said pedal cluster comprises a brake pedal and an accelerator pedal.

7. The vehicle body and drive train structure according to claim 1, wherein said vehicle body frame is substantially bilaterally symmetrical.

8. A multi-use vehicle, comprising
    a vehicle body frame;
    a plurality of seats disposed in the vehicle body frame and arranged side by side in a vehicle width direction;
    a pedal cluster operatively attached to said vehicle body frame; and
    a drive train operatively associated with said vehicle body frame and comprising:
    an internal combustion engine operatively supported on the vehicle body frame and comprising a crankshaft;
    a front propeller shaft assembly operatively connected to the crankshaft of the internal combustion engine, and configured to transmit a driving force of the internal combustion engine to front wheels of the vehicle;
    a rear propeller shaft assembly operatively connected to the crankshaft of the internal combustion engine, and configured to transmit a driving force of the internal combustion engine to rear wheels of the vehicle;
a front driveshaft having said front wheels rotatably attached respectively to both end portions thereof;
a rear driveshaft having said rear wheels rotatably attached respectively to both end portions thereof;
a front final drive unit disposed between the front propeller shaft assembly and the front driveshaft, and configured to transmit the driving force from the front propeller shaft assembly to the front driveshaft;
a rear final drive unit disposed between the rear propeller shaft assembly and the rear driveshaft, and configured to transmit the driving force from the rear propeller shaft assembly to the rear driveshaft;
a fuel tank disposed on one lateral side of the vehicle body frame, and arranged so as to overlap the first propeller shaft when viewed in a side view; and
a reduction gear located rearward of the pedal cluster and frontward of the occupant seats;
wherein the front propeller shaft assembly comprises a first propeller shaft disposed rearward of the reduction gear, and a second propeller shaft disposed forward of the reduction gear;
wherein said reduction gear is operable to rotate said second propeller shaft in a direction reverse to a rotational direction of the first propeller shaft; and
wherein the second propeller shaft is offset in the vehicle width direction with respect a center line of the vehicle.

9. A multi-use vehicle according to claim 8, wherein said plurality of seats comprises a first seat and a second seat arranged side by side; and wherein said second propeller shaft is offset toward the second seat with respect to the first propeller shaft.

10. The multi-use vehicle according to claim 9, wherein
the first propeller shaft is substantially aligned with a center line of a vehicle body, and the second propeller shaft is offset toward the second seat side with respect to the center line of the vehicle body;
the second propeller shaft is connected to the front final drive unit on the second seat side in the vehicle width direction; and
the front final drive unit is substantially aligned with the center line of the vehicle body.

11. A multi-use vehicle according to claim 9, wherein said first seat is arranged on one of a left side and a right side of the vehicle body frame, said second seat is arranged on the other of said left side and said right side of the vehicle body frame; and wherein said pedal cluster is located forward of said first seat.

12. The multi-use vehicle according to claim 8, wherein
the first propeller shaft is substantially aligned with a center line of a vehicle body, and the second propeller shaft is offset toward a second seat side with respect to the center line of the vehicle body;
the second propeller shaft is connected to the front final drive unit on the second seat side in the vehicle width direction; and
the front final drive unit is substantially aligned with the center line of the vehicle body.

13. The multi-use vehicle according to claim 8, wherein a first seat is arranged on one of a left side and a right side of the vehicle body frame, a second seat is arranged on the other of said left side and said right side of the vehicle body frame; and wherein said pedal cluster is located forward of said first seat.

14. A multi-use vehicle according to claim 8, wherein said pedal cluster comprises a brake pedal and an accelerator pedal; and wherein said vehicle body frame is a substantially bilaterally symmetrical.

15. A vehicle comprising:
a vehicle body frame;
an occupant seat disposed in said vehicle body frame;
a pedal cluster operatively attached to said vehicle body frame and comprising a brake pedal and an accelerator pedal; and
a drive train operatively associated with said vehicle body frame and comprising:
an internal combustion engine operatively supported on the vehicle body frame;
a propeller shaft assembly operatively connected to a crankshaft of the internal combustion engine, and configured to transmit a driving force of the internal combustion engine to front wheels of the vehicle;
a driveshaft having said front wheels rotatably attached respectively to both end portions thereof;
a final drive unit disposed between the propeller shaft assembly and the driveshaft, and configured to transmit the driving force from the propeller shaft assembly to the driveshaft; and
a reduction gear located rearward of each of said brake pedal and said accelerator pedal, and frontward of the occupant seat; and
a fuel tank for storing fuel;
wherein said seat comprises a first seat and a second seat arranged side by side; and wherein said second propeller shaft is offset toward the second seat with respect to the first propeller shaft;
wherein said fuel tank is disposed on a second seat side of the vehicle body frame, and arranged so as to overlap the first propeller shaft when viewed in a side view;
wherein the propeller shaft assembly comprises a first propeller shaft disposed rearward of the reduction gear, and a second propeller shaft disposed forward of the reduction gear;
wherein said reduction gear is operable to rotate said second propeller shaft in a direction reverse to a rotational direction of the first propeller shaft; and
wherein the second propeller shaft is offset in the vehicle width direction with respect to the first propeller shaft.

16. The vehicle according to claim 15, wherein the first propeller shaft and the final drive unit are each substantially aligned with a center line of a vehicle body, and the second propeller shaft is offset from the center line of the vehicle body.

17. The vehicle according to claim 15, wherein:
the first propeller shaft is substantially aligned with a center line of a vehicle body, and the second propeller shaft is offset toward the second seat side with respect to the center line of the vehicle body;
said first seat is located on one of a left side and a right side of the vehicle body frame, said second seat is located on the other of said left side and said right side of the vehicle body frame; and each of said brake pedal and said accelerator pedal is located forward of said first seat.

* * * * *